United States Patent
Bengea et al.

(10) Patent No.: US 10,378,455 B2
(45) Date of Patent: Aug. 13, 2019

(54) METHOD FOR SELECTION OF OPTIMAL ENGINE OPERATING CONDITIONS FOR GENERATING LINEARIZED MODELS FOR ON-BOARD CONTROL AND ESTIMATION

(71) Applicant: UNITED TECHNOLOGIES CORPORATION, Farmington, CT (US)

(72) Inventors: Sorin Bengea, Glastonbury, CT (US); Jeffrey C. Simmons, Middletown, CT (US)

(73) Assignee: United Technologies Corporation, Farmington, CT (US)

(*) Notice: Subject to any disclaimer, the term of this patent is extended or adjusted under 35 U.S.C. 154(b) by 220 days.

(21) Appl. No.: 15/688,614

(22) Filed: Aug. 28, 2017

(65) Prior Publication Data
US 2019/0063333 A1   Feb. 28, 2019

(51) Int. Cl.
*F02C 9/26* (2006.01)
*G05B 17/02* (2006.01)
(Continued)

(52) U.S. Cl.
CPC ......... *F02C 9/26* (2013.01); *F23N 1/002* (2013.01); *G05B 17/02* (2013.01); *G06F 9/455* (2013.01);
(Continued)

(58) Field of Classification Search
CPC ........ F02C 9/26; F23N 1/002; F23N 2023/40; F23N 2041/20; G05B 17/02; G06F 9/455
(Continued)

(56) References Cited

U.S. PATENT DOCUMENTS

| 8,117,017 B2 * | 2/2012 | Ellis ................. G05B 17/02 701/100 |
| 8,126,629 B2 | 2/2012 | Buchalter et al. |

(Continued)

FOREIGN PATENT DOCUMENTS

| EP | 1906291 | 4/2008 |
| EP | 2256641 | 12/2010 |

(Continued)

OTHER PUBLICATIONS

European Patent Office, European Search Report dated Jan. 11, 2019 in Application No. 18191315.3.

*Primary Examiner* — Tuan C To
(74) *Attorney, Agent, or Firm* — Snell & Wilmer, L.L.P.

(57) ABSTRACT

A system for generating a base point database for use by a full authority digital engine control (FADEC) to control a gas turbine engine includes a memory configured to store a model of the gas turbine engine. The system also includes a model generation processor coupled to the memory and designed to perform an initial simulation of the gas turbine engine using the model to determine ranges of sensitivity of desired engine parameters throughout an operating envelope, divide the operating envelope into a multiple regions based on the ranges of sensitivity of the desired engine parameters, select multiple combinations of base points within each of the multiple regions, perform an additional simulation of the gas turbine engine to determine an accuracy of interpolation between each of the multiple combinations of base points for each of the multiple regions, and select final base points from the multiple combinations of base points based on the accuracy.

20 Claims, 5 Drawing Sheets

(51) Int. Cl.
    *G06F 9/455*    (2018.01)
    *F23N 1/00*     (2006.01)
(52) U.S. Cl.
    CPC ...... *F23N 2023/40* (2013.01); *F23N 2041/20* (2013.01)
(58) Field of Classification Search
    USPC ........................................................ 701/100
    See application file for complete search history.

(56) References Cited

U.S. PATENT DOCUMENTS

| | | | |
|---|---|---|---|
| 9,618,919 B2 | 4/2017 | Viassolo et al. | |
| 2008/0120074 A1* | 5/2008 | Volponi | F01D 21/00 703/7 |
| 2010/0024536 A1* | 2/2010 | Adibhatla | G05B 17/02 73/112.01 |
| 2011/0052370 A1 | 3/2011 | Karpman et al. | |
| 2013/0325286 A1* | 12/2013 | Lacaille | G05B 23/0221 701/99 |
| 2015/0094939 A1 | 4/2015 | D'Amato et al. | |
| 2016/0171796 A1* | 6/2016 | Volponi | G06F 16/245 701/14 |
| 2016/0252019 A1* | 9/2016 | Joshi | F02C 9/20 60/776 |
| 2018/0099760 A1* | 4/2018 | Paul | B64D 31/06 |
| 2018/0297718 A1* | 10/2018 | Adibhatla | B64F 5/60 |
| 2018/0354646 A1* | 12/2018 | Nakhjavani | B64D 45/00 |
| 2019/0002118 A1* | 1/2019 | Nestico | B64D 33/04 |
| 2019/0005826 A1* | 1/2019 | Lax | G01C 21/20 |
| 2019/0032560 A1* | 1/2019 | Fiedler | F02C 7/26 |

FOREIGN PATENT DOCUMENTS

| | | | | |
|---|---|---|---|---|
| JP | 2002180851 A | * | 6/2002 | ............... F02C 9/00 |
| JP | 2004276901 A | * | 10/2004 | ........... F01D 21/045 |

\* cited by examiner

METHOD FOR SELECTION OF OPTIMAL ENGINE OPERATING CONDITIONS FOR GENERATING LINEARIZED MODELS FOR ON-BOARD CONTROL AND ESTIMATION

FIELD

The present disclosure is directed to systems and methods for determining optimal base points, or predetermined operating conditions, for use by a full authority digital engine control (FADEC) during flight to control operation of a gas turbine engine.

BACKGROUND

Aircraft that are propelled by gas turbine engines, such as modern commercial and military aircraft, may include a full authority digital engine control (FADEC) that is designed to control various aspects of the gas turbine engine based on current operating conditions. The FADEC may include one or more engine model and a plurality of base points corresponding to various operating conditions of the gas turbine engine. The FADEC may receive data from one or more sensors of the gas turbine engine, may determine how to control the gas turbine engine by comparing the received data to the plurality of base points, and may control the gas turbine engine accordingly.

SUMMARY

Disclosed herein is a system for generating a base point database for use by a full authority digital engine control (FADEC) to control a gas turbine engine during flight. The system includes a memory configured to store a model of the gas turbine engine. The system also includes a model generation processor coupled to the memory and designed to perform an initial simulation of the gas turbine engine using the model to determine ranges of sensitivity of desired engine parameters throughout an operating envelope, divide the operating envelope into a multiple regions based on the ranges of sensitivity of the desired engine parameters, select multiple combinations of base points within each of the multiple regions, perform an additional simulation of the gas turbine engine to determine an accuracy of interpolation between each of the multiple combinations of base points for each of the multiple regions, and select final base points from the multiple combinations of base points based on the accuracy.

In any of the foregoing embodiments, the model generation processor is further configured to divide the operating envelope into the multiple regions by selecting each of the multiple regions to have similar ranges of sensitivity.

In any of the foregoing embodiments, the model generation processor is further configured to select the final base points based on a trade-off analysis between the accuracy of interpolation and memory requirements of the FADEC.

In any of the foregoing embodiments, the final base points include a first quantity of base points in a first region and a second quantity of base points in a second region, the first quantity of base points being different than the second quantity of base points.

In any of the foregoing embodiments, the model generation processor is further configured to determine a quantity range of base points that may be used in each of the multiple regions.

In any of the foregoing embodiments, the desired engine parameters include at least one of a temperature, a pressure, a thrust ratio, an air flow ratio, a flow parameter, a thrust ratio, an air flow ratio, a flow parameter, or an altitude of the gas turbine engine.

In any of the foregoing embodiments, the model generation processor is further configured to upload the final base points to the FADEC to be stored in the base point database.

Any of the foregoing embodiments may also include the gas turbine engine, a sensor coupled to the gas turbine engine and configured to detect a first parameter corresponding to one of the desired engine parameters, and the FADEC. The FADEC is further configured to control the gas turbine engine by comparing the first parameter to the base point database and interpolating a specific value between two of the final base points.

Also disclosed is a method for generating a base point database for use by a full authority digital engine control (FADEC) to control a gas turbine engine during flight. The method includes performing, by a model generation processor, an initial simulation of the gas turbine engine using a model to determine ranges of sensitivity of desired engine parameters throughout an operating envelope. The method also includes dividing, by the model generation processor, the operating envelope into a multiple regions based on the ranges of sensitivity of the desired engine parameters. The method also includes selecting, by the model generation processor, multiple combinations of base points within each of the multiple regions. The method also includes performing, by the model generation processor, an additional simulation of the gas turbine engine to determine an accuracy of interpolation between each of the multiple combinations of base points for each of the multiple regions. The method also includes selecting, by the model generation processor, final base points from the multiple combinations of base points based on the accuracy.

In any of the foregoing embodiments, dividing, by the model generation processor, the operating envelope into the multiple regions includes selecting each of the multiple regions to have similar ranges of sensitivity.

In any of the foregoing embodiments, selecting the final base points includes performing a trade-off analysis between the accuracy of interpolation and memory requirements of the FADEC.

In any of the foregoing embodiments, the final base points include a first quantity of base points in a first region and a second quantity of base points in a second region, the first quantity of base points being different than the second quantity of base points.

Any of the foregoing embodiments may also include determining, by the model generation processor, a quantity range of base points that may be used in each of the multiple regions.

In any of the foregoing embodiments, the desired engine parameters include at least one of a temperature, a pressure, a thrust ratio, an air flow ratio, a flow parameter, or an altitude of the gas turbine engine.

Any of the foregoing embodiments may also include uploading, by the model generation processor, the final base points to the FADEC to be stored in the base point database.

Any of the foregoing embodiments may also include detecting, by a sensor coupled to the gas turbine engine, a first parameter corresponding to one of the desired engine parameters, and controlling, by the FADEC, the gas turbine engine by comparing the first parameter to the base point database and interpolating a specific value between two of the final base points.

Also disclosed is a system for controlling a gas turbine engine of an aircraft. The system includes the gas turbine engine. The system also includes a sensor coupled to the gas turbine engine and configured to detect a first parameter corresponding to the gas turbine engine. The system also includes a full authority digital engine control (FADEC) configured to store a base point database and to control the gas turbine engine based on the first parameter and the base point database. The system also includes an offline model generation device. The off-line model generation device includes a memory configured to store a model of the gas turbine engine, and a model generation processor coupled to the memory. The model generation processor is designed to perform an initial simulation of the gas turbine engine using the model to determine ranges of sensitivity of desired engine parameters throughout an operating envelope, divide the operating envelope into multiple regions based on the ranges of sensitivity of the desired engine parameters, select multiple combinations of base points within each of the multiple regions, perform an additional simulation of the gas turbine engine to determine an accuracy of interpolation between each of the multiple combinations of base points for each of the multiple regions, select final base points from the multiple combinations of base points based on the accuracy, and upload the final base points to the FADEC to be stored in the base point database.

In any of the foregoing embodiments, the model generation processor is further configured to divide the operating envelope into the multiple regions by selecting each of the multiple regions to have similar ranges of sensitivity.

In any of the foregoing embodiments, the model generation processor is further configured to select the final base points based on a trade-off analysis between the accuracy of interpolation and memory requirements of the FADEC.

In any of the foregoing embodiments, the model generation processor is further configured to determine a quantity range of base points that may be used in each of the multiple regions.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
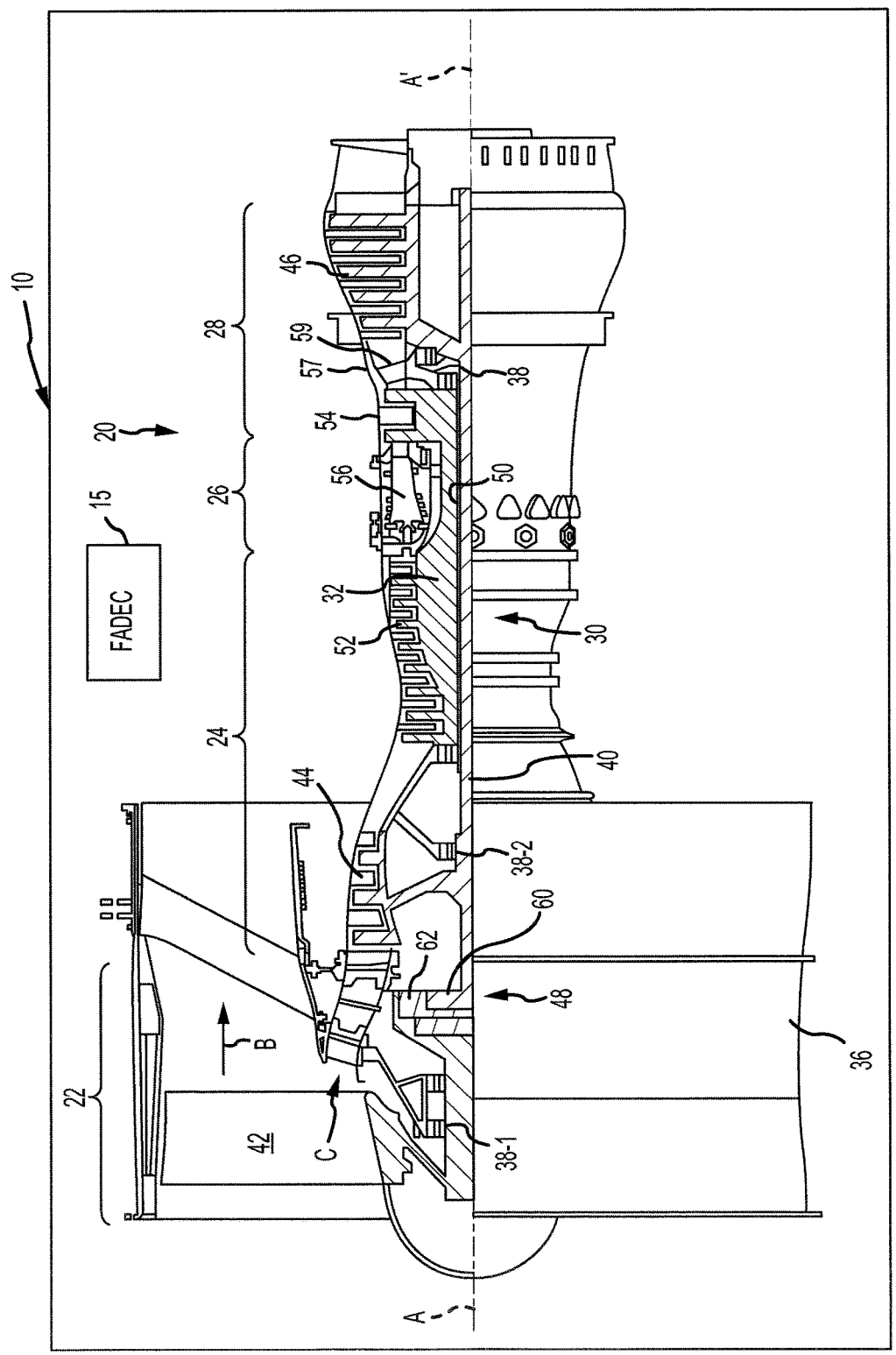
FIG. 1 is a schematic cross-section of a gas turbine engine, in accordance with various embodiments.

In various embodiments and with reference to FIG. 1, an aircraft 10 having a full authority digital engine control (FADEC) 15 and a gas turbine engine 20 is provided. The FADEC 15 may be positioned on the aircraft 10 and may control operation of the gas turbine engine 20 based on data received from various sensors.

The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 26 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be received and conditioned by a fan exit stator 70. After conditioning, the airflow of core flow path C may be compressed by the low pressure compressor 44 then the high pressure compressor 52, mixed and burned with fuel in the combustor 26, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 2:
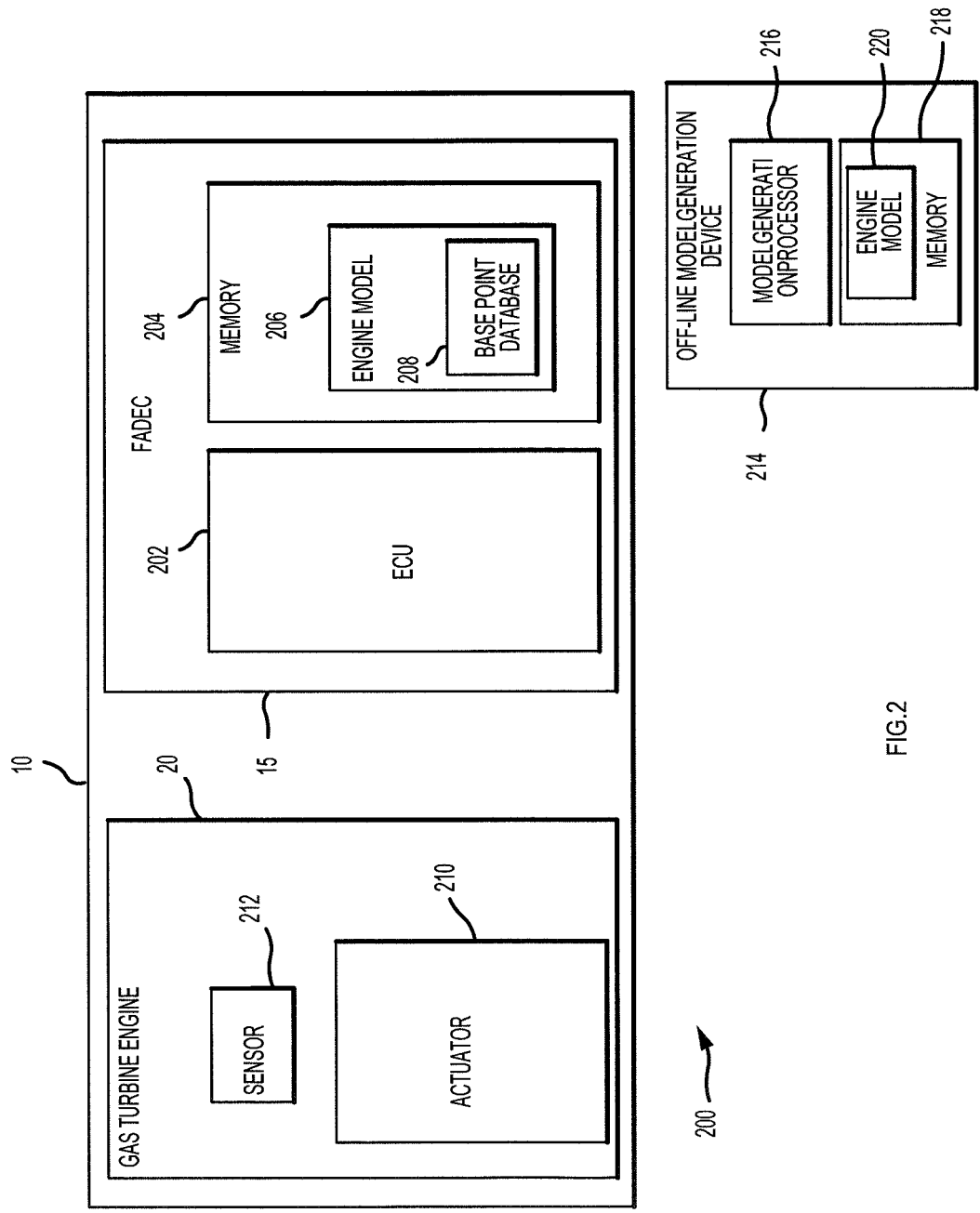
FIG. 2 is a block diagram illustrating a system for generating a base point database for use by a full authority digital engine control (FADEC) to control the gas turbine engine of FIG. 1, in accordance with various embodiments.

Referring now to FIG. 2, a system 200 for generating a base point database for use by the FADEC 15 to control the gas turbine engine 20 is shown. The system 200 may include the aircraft 10 having the FADEC 15 and the gas turbine engine 20. The system 200 may further include an off-line model generation device 214 that is separate from the aircraft 10. In various embodiments, the off-line model generation device 214 may be located on the aircraft 10.

The gas turbine engine 20 may include one or more actuator 210 and one or more sensor 212. The actuator 210 may include any actuator that can be used to control operation of the gas turbine engine 20. For example, the actuator may include a valve actuator that controls an amount of fuel provided to the gas turbine engine 20, a transmission actuator that changes gear ratios of the gas turbine engine 20, a vane actuator that controls orientation of a vane, a bleed actuator that controls a flow of bleed air, or the like.

The sensor 212 may include any sensor capable of detecting a scheduling engine parameter (i.e., an engine parameter used for scheduling) of the gas turbine engine 20. The scheduling engine parameter may include one or more of a temperature of a portion of the gas turbine engine 20, a pressure within a portion of the gas turbine engine 20, a thrust ratio of the gas turbine engine 20, an air flow ratio of the gas turbine engine 20, a flow parameter at a given station of the gas turbine engine 20, an altitude of the aircraft 10, or the like. In that regard, the sensor 212 may include a ground speed sensor, a temperature sensor, a pressure sensor, or the like.

The FADEC 15 may include an electronic control unit (ECU) 202 and a memory 204. The memory 204 may include an engine model 206 that includes a model of the gas turbine engine 20 along with a base point database 208. The base point database 208 includes a plurality of base points that corresponds to different operating conditions of the gas turbine engine 20. For example, one base point may correspond to a first altitude and a first ground speed of the aircraft 10, and another base point may correspond to a second altitude and a second ground speed of the aircraft 10.

The ECU 202 may receive measured or detected parameter data from the sensor 212 and may compare the detected parameter data to the base point database 208. If the parameter data fails to exactly match a base point in the base point database 208 then the ECU 202 may interpolate values between the nearest two base points that correspond to the parameter data. Based on the interpolated values, the ECU 202 may control the actuator 210 to adjust operation of the gas turbine engine 20. In particular, the base point database 208 may include base points in different regions, as described below. The ECU 202 may interpolate values between two base points in a same region regardless of whether a closer base point is available in another region.

The off-line model generation device 214 may identify optimal base points to be stored in the base point database 208 of the FADEC 15. In particular, the off-line model generation device 214 may include a model generation processor 216 and a memory 218 that includes one or more engine model 220. The engine model 220 may correspond to the gas turbine engine 20. The model generation processor 216 may perform multiple simulations using the engine model 220 and may identify optimal base points based on the simulations.

Figure 3:
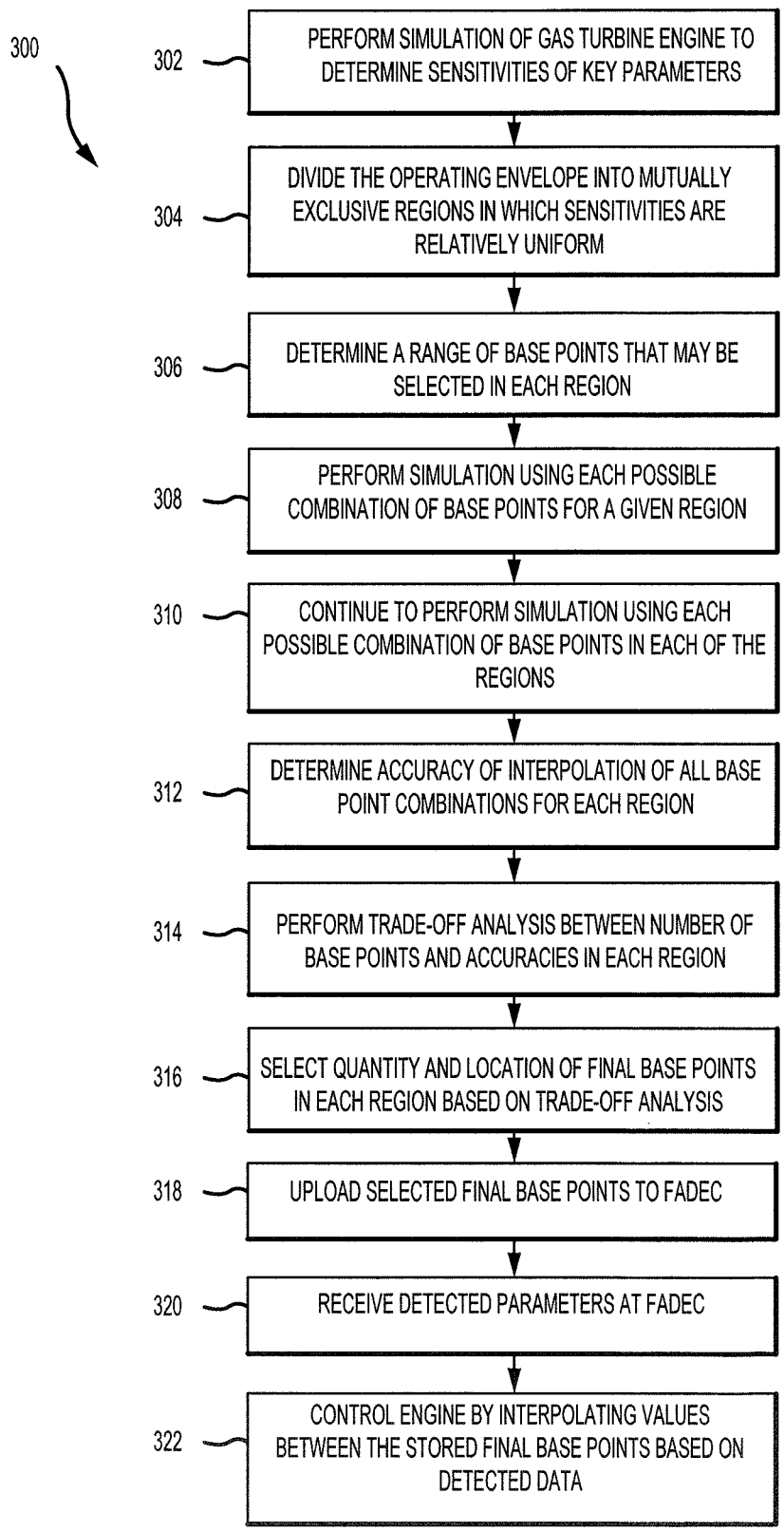
FIG. 3 is a flowchart illustrating a method for generating a base point database for use by a full authority digital engine control (FADEC) to control a gas turbine engine, in accordance with various embodiments.

Referring now to FIG. 3, a method 300 may be used to generate a base point database for use by a FADEC, such as the FADEC 15, to control a gas turbine engine, such as the gas turbine engine 20, during flight. Portions of the method 300 may be performed by an off-line model generation device, such as the off-line model generation device 214 of FIG. 2.

In block 302, a model generation processor may perform multiple simulations of a gas turbine engine to determine ranges of sensitivity of desired engine parameters (i.e., engine parameters whose estimates are being sought) using a model. The model may be an Aero-Thermodynamic Simulation nonlinear model. The simulations may be performed for multiple flight conditions, power levels, and ambient conditions of the gas turbine engine. The simulations may also be performed for an entire operating envelope which may correspond to a map of all operating conditions of the gas turbine engine. The map may be oriented based on scheduling parameters such as a ground speed of the aircraft (i.e., a Mach speed), a power output of the gas turbine engine, or the like.

The key desired engine parameters may include, for example, one or more of a temperature, a pressure, an altitude, a thrust ratio, an air flow ratio, a flow parameter, a ground speed, or a power level of the gas turbine engine. The ranges of sensitivity may correspond to gradients, or rates of change, of the desired engine parameters between adjacent locations in the operating envelope.

In block 304, the model generation processor may divide the operating envelope into mutually exclusive regions based on the ranges of sensitivity determined in block 302. In particular, the model generation processor may select the regions such that each region has similar, or relatively uniform, ranges of sensitivity.

It has been determined that ranges of sensitivity may be relatively large along certain paths (which may correspond to large ranges of sensitivity in various maps or to switching points in schedules). These paths, or lines, may be used to define boundaries of the regions. The thresholds used to define each region may be selected based on a desired number of regions and an overall range of sensitivity magnitudes.

Figure 4:
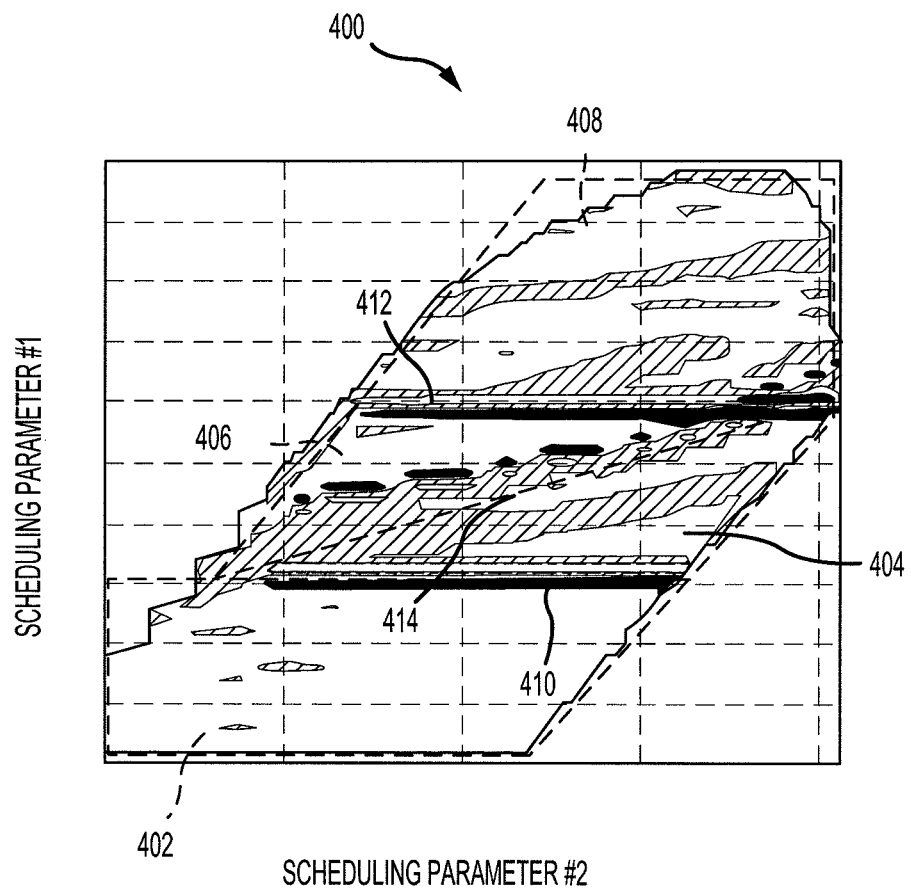
FIG. 4 is a plot illustrating an operating envelope having multiple regions defined by ranges of sensitivity of desired engine parameters, in accordance with various embodiments.

For example and referring to FIG. 4, an exemplary operating envelope 400 is shown. The operating envelope 400 is plotted using a first scheduling parameter, such as a ground speed of the aircraft, and a second scheduling parameter, such as a power level of the aircraft. Areas in the operating envelope 400 that have similar patterning are determined to have relatively similar ranges of sensitivity. Thus, the operating envelope 400 may be said to have relatively high ranges of sensitivity along paths, or lines, that run between areas of different patterning. In particular, the operating envelope 400 includes a first path 410, a second path 412, and a third path 414 that each correspond to relatively high ranges of sensitivity.

In that regard, the model generation processor has divided the operating envelope 400 into four regions: a first region 402, a second region 404, a third region 406, and a fourth region 408. The desired engine parameters within each of the regions 402, 404, 406, 408 may have relatively similar values. In that regard, the regions 402, 404, 406, 408 may each have relatively uniform ranges of sensitivity therein.

Returning reference to FIG. 3, the model generation processor may determine a range of base points that may be selected in each region in block 306. The range of base points may correspond to acceptable quantities of base points within each region. The range of base points may be determined based on an amount of available memory within the FADEC. For example, sufficient memory may be available to store between 5 and 10 base points for each region. In that regard, the model generation processor may set the range of base points to be between 5 and 10.

In block 308, the model generation processor may perform a simulation within a particular region using each possible combination of base points. For example, if the range of base points is between 5 and 10 than the model generation processor may perform a simulation within a first region for all combinations of 5 base points, all combinations of 6 base points, all combinations of 7 base points, and the like.

Figure 5:
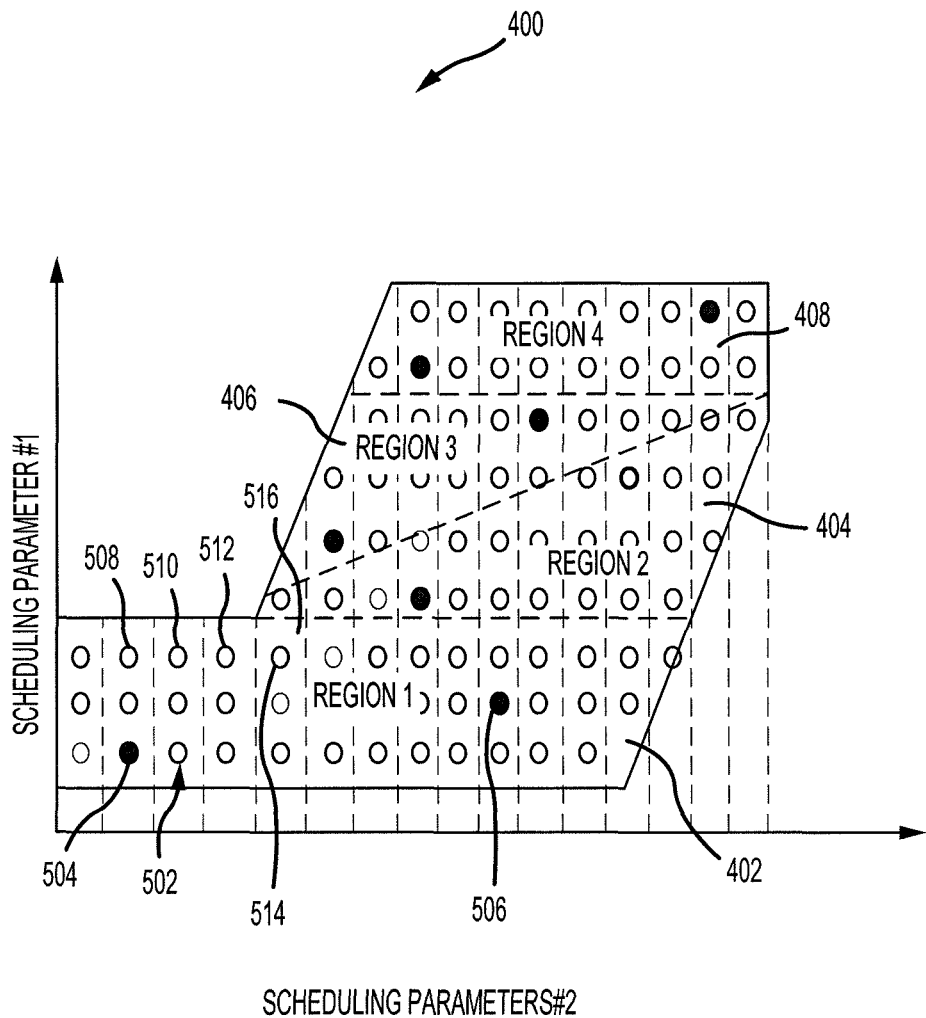
FIG. 5 is a plot illustrating potential base points and final base points the multiple regions of the operating envelope of FIG. 4, in accordance with various embodiments.

For example and referring to FIG. 5, the operating envelope 400 may include a plurality of potential base points 502 including a first potential base point 508, a second potential base point 510, a third potential base point 512, and a fourth potential base point 514. Assuming that the range of base points is between 2 and 4, a first simulation may be performed using the first potential base point 508 and the second potential base point 510; a second simulation may be performed using the first potential base point 508 and the third potential base point 512; a third simulation may be performed using the first potential base point 508 and the fourth potential base point 514; and so forth. A simulation may likewise be performed using the first potential base point 508, the second potential base point 510, and the third potential base point 512; and a second simulation may be performed using the first potential base point 508, the second potential base point 510, and the fourth potential base point 514.

Returning reference to FIG. 3 and in block 310, the model generation processor may continue to perform simulations using each possible combination of base points in each of the regions within the operating envelope. In that regard, block 308 may be performed for each region of the operating envelope.

In block 312, the model generation processor may simulate interpolation of values between all base point combinations in each region of the operating envelope. Such simulation may provide accuracy data corresponding to the accuracy of interpolation between each base point combination.

When simulating interpolation of values, the model generation processor may select only base points within a given region. For example and referring again to FIG. 5, an operating condition may be located at a point 516. Assuming the first potential base point 508 and the second potential base point 510 are selected for the given the simulation, the model generation processor may perform the interpolation using the first potential base point 508 and the second potential base point 510, although potential base points may exist in region two 404 and region three 406 which are closer to the point 516.

Returning reference to FIG. 3 and in block 314, the model generation processor may perform a trade-off analysis between available memory in the FADEC and corresponding accuracies in each region. For example, each region may have between two and four base points, however, the FADEC may not have sufficient memory to store four base points for each region. In that regard, the model generation processor may determine the accuracy in each region for each potential set of base points. The model generation processor may determine that a first region has a ninety percent (90%) accuracy using two base points and that a second region has a 90% accuracy using four base points. In such a situation, the model generation processor may determine that the first region should use two base points and that the second region should use four base points to optimize accuracy within each region.

In block 316, the model generation processor may select a quantity and specific locations of final base points in each region based on the determined accuracies and the trade-off analysis. For example, the model generation processor may select the quantity of final base points in each region based on the trade-off and may select the location of final base points in each region by selecting the specific base points that provide the highest accuracy during interpolation. For example and referring again to FIG. 5, the model generation processor may determine that the first region 402 should have two final base points including a first final base point 504 and a second final base point 506.

Returning reference to FIG. 3, the model generation processor may upload the selected final base points to the FADEC in block 318. In block 320, the FADEC may receive the final base points and may update the base point database with the final base points.

In block 322, the FADEC may control the gas turbine engine by interpolating values between the stored final base points based on data detected by one or more sensor of the gas turbine engine. During operation, the FADEC may interpolate values between two or more base points that are within the same region as the current operating condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for generating a base point database for use by a full authority digital engine control (FADEC) to control a gas turbine engine during flight, the system comprising:
    a memory configured to store a model of the gas turbine engine; and
    a model generation processor coupled to the memory and configured to:
        perform an initial simulation of the gas turbine engine using the model to determine ranges of sensitivity of desired engine parameters throughout an operating envelope,
        divide the operating envelope into a multiple regions based on the ranges of sensitivity of the desired engine parameters,
        select multiple combinations of base points within each of the multiple regions,
        perform an additional simulation of the gas turbine engine to determine an accuracy of interpolation between each of the multiple combinations of base points for each of the multiple regions, and
        select final base points from the multiple combinations of base points based on the accuracy.

2. The system of claim 1, wherein the model generation processor is further configured to divide the operating envelope into the multiple regions by selecting each of the multiple regions to have similar ranges of sensitivity.

3. The system of claim 1, wherein the model generation processor is further configured to select the final base points based on a trade-off analysis between the accuracy of interpolation and memory requirements of the FADEC.

4. The system of claim 1, wherein the final base points include a first quantity of base points in a first region and a second quantity of base points in a second region, the first quantity of base points being different than the second quantity of base points.

5. The system of claim 1, wherein the model generation processor is further configured to determine a quantity range of base points that may be used in each of the multiple regions.

6. The system of claim 1, wherein the desired engine parameters include at least one of a temperature, a pressure, a thrust ratio, an air flow ratio, a flow parameter, a thrust ratio, an air flow ratio, a flow parameter, or an altitude of the gas turbine engine.

7. The system of claim 1, wherein the model generation processor is further configured to upload the final base points to the FADEC to be stored in the base point database.

8. The system of claim 7, further comprising:
the gas turbine engine;
a sensor coupled to the gas turbine engine and configured to detect a first parameter corresponding to one of the desired engine parameters; and
the FADEC,
wherein the FADEC is further configured to control the gas turbine engine by comparing the first parameter to the base point database and interpolating a specific value between two of the final base points.

9. A method for generating a base point database for use by a full authority digital engine control (FADEC) to control a gas turbine engine during flight, the method comprising:
performing, by a model generation processor, an initial simulation of the gas turbine engine using a model to determine ranges of sensitivity of desired engine parameters throughout an operating envelope;
dividing, by the model generation processor, the operating envelope into a multiple regions based on the ranges of sensitivity of the desired engine parameters;
selecting, by the model generation processor, multiple combinations of base points within each of the multiple regions;
performing, by the model generation processor, an additional simulation of the gas turbine engine to determine an accuracy of interpolation between each of the multiple combinations of base points for each of the multiple regions; and
selecting, by the model generation processor, final base points from the multiple combinations of base points based on the accuracy.

10. The method of claim 9, wherein dividing, by the model generation processor, the operating envelope into the multiple regions includes selecting each of the multiple regions to have similar ranges of sensitivity.

11. The method of claim 9, wherein selecting the final base points includes performing a trade-off analysis between the accuracy of interpolation and memory requirements of the FADEC.

12. The method of claim 9, wherein the final base points include a first quantity of base points in a first region and a second quantity of base points in a second region, the first quantity of base points being different than the second quantity of base points.

13. The method of claim 9, further comprising determining, by the model generation processor, a quantity range of base points that may be used in each of the multiple regions.

14. The method of claim 9, wherein the desired engine parameters include at least one of a temperature, a pressure, a thrust ratio, an air flow ratio, a flow parameter, or an altitude of the gas turbine engine.

15. The method of claim 9, further comprising uploading, by the model generation processor, the final base points to the FADEC to be stored in the base point database.

16. The method of claim 15, further comprising:
detecting, by a sensor coupled to the gas turbine engine, a first parameter corresponding to one of the desired engine parameters; and
controlling, by the FADEC, the gas turbine engine by comparing the first parameter to the base point database and interpolating a specific value between two of the final base points.

17. A system for controlling a gas turbine engine of an aircraft, comprising:
the gas turbine engine;
a sensor coupled to the gas turbine engine and configured to detect a first parameter corresponding to the gas turbine engine;
a full authority digital engine control (FADEC) configured to store a base point database and to control the gas turbine engine based on the first parameter and the base point database; and
an offline model generation device having:
a memory configured to store a model of the gas turbine engine, and
a model generation processor coupled to the memory and configured to:
perform an initial simulation of the gas turbine engine using the model to determine ranges of sensitivity of desired engine parameters throughout an operating envelope,
divide the operating envelope into a multiple regions based on the ranges of sensitivity of the desired engine parameters,
select multiple combinations of base points within each of the multiple regions,
perform an additional simulation of the gas turbine engine to determine an accuracy of interpolation between each of the multiple combinations of base points for each of the multiple regions,
select final base points from the multiple combinations of base points based on the accuracy, and
upload the final base points to the FADEC to be stored in the base point database.

18. The system of claim 17, wherein the model generation processor is further configured to divide the operating envelope into the multiple regions by selecting each of the multiple regions to have similar ranges of sensitivity.

19. The system of claim 17, wherein the model generation processor is further configured to select the final base points based on a trade-off analysis between the accuracy of interpolation and memory requirements of the FADEC.

20. The system of claim 17, wherein the model generation processor is further configured to determine a quantity range of base points that may be used in each of the multiple regions.

* * * * *